United States Patent [19]

Srebot et al.

[11] Patent Number: 4,943,071
[45] Date of Patent: Jul. 24, 1990

[54] COLLET ADAPTABLE TO A MACHINE-TOOL FITTED WITH A CHUCK

[75] Inventors: Robert Srebot, Ris-Orangis; Bernard Berthoud, Ponthierry, both of France

[73] Assignee: S.A. Srebort, Cedex, France

[21] Appl. No.: 388,330

[22] Filed: Aug. 1, 1989

[30] Foreign Application Priority Data

Aug. 3, 1988 [FR] France ................ 88 10517

[51] Int. Cl.⁵ ............................................. B23B 31/10
[52] U.S. Cl. ........................... 279/43; 279/46 R; 279/50; 279/110
[58] Field of Search ............ 279/1 S, 2 R, 41 R, 279/43, 46 R, 50, 110

[56] References Cited

U.S. PATENT DOCUMENTS

| 1,981,660 | 11/1934 | Olson | 279/46 |
|---|---|---|---|
| 2,338,060 | 12/1943 | Redmer | 279/50 |
| 2,456,776 | 12/1948 | Faust | 279/6 |
| 2,621,938 | 12/1952 | Ziegler | 279/50 |

FOREIGN PATENT DOCUMENTS

| 962845 | 4/1957 | Fed. Rep. of Germany | 279/50 |
|---|---|---|---|
| 3127486 | 1/1983 | Fed. Rep. of Germany | |
| 1159982 | 9/1956 | France | |
| 470960 | 4/1952 | Italy | 279/50 |

Primary Examiner—Daniel Howell
Attorney, Agent, or Firm—Bryan, Cave, McPheeters & McRoberts

[57] ABSTRACT

The invention concerns a collet adaptable to a machine-tool that includes a chuck for clasping a workpiece to be machined, the chuck comprising a front face, at least two clasping jaws moveably affixed to jaw position adjustment means and a control device for the said position adjustment means.

The collet is comprised of a frame capable of being affixed to the chuck; a main sliding element that is slidably mounted on the frame; the collet per se affixed to the frame and fitted with several stems, the latter each comprising a frustoconical face for controlling the radial displacement of the stems, cooperating with a frustoconical face of the main sliding element; and slides slidably mounted in the frame and cooperating with the main sliding element, and capable of being joined to adjustment devices controlling the position of the holding jaw bits.

One application is to provide the simple adaptation of a special collet on an existing machine-tool.

5 Claims, 4 Drawing Sheets

COLLET ADAPTABLE TO A MACHINE-TOOL FITTED WITH A CHUCK

BACKGROUND OF THE INVENTION

Modern, high-performance production tools are far from being used to their maximum capacity. This observation becomes all the more significant in such fields as the aeronautical industry, special-purpose machines, small production runs, etc.

Moreover, economic imperatives impose both small stocks of finished products and swift reactions to market forces.

To attain an optimum management of manufacturing time it is necesary to reduce as much as possible both the dead time between two machining operations and the machine setting-up time when changing from machining one type of workpiece to another.

A large part of this time is spent on a "tricky" operation that predetermines all the rest of the manufacturing process; it concerns the setting-up of the workpieces in their machine and their proper fitting therein.

SUNNARY OF THE INVENTION

The invention thus relates to a collet that is adaptable to a machine tool, which includes a chuck for holding a workpiece to be machined, said chuck comprising a front face, at least two holding jaws that are moveably affixed on elements for adjusting their position and a device for controlling said position adjustment elements.

According to the invention, the above collet includes a frame having a rear face that is fixable, by said rear face, to said front face of the chuck and having, on the one hand, a central bore possessing a symmetry axis and, on the other, radial grooves opening onto the collet's rear face; a main sliding element fitted with a cylindrical face corresponding to the bore of the frame, slidably mounted with respect to said bore, and further provided with both a frustoconical rear face whose axis is in line with the symmetry axis of the frame's bore, and a partially cylindrical bore; the collet per se, whose rear portion is affixed to the frame and whose front portion includes several uniformly-distributed branches around the symmetry axis of frame's bore, each of these branches having an axial face for holding a workpiece and a frustoconical face for controlling the radial displacement of said stem, which frustoconical face cooperates with a frustoconical face that is unitary with the main sliding element, so as to make an axial displacement of said main sliding element correspond to a radial displacement of said stem of the collet per se; slides that are slidably mounted within the grooves of the frame and which each include a frustoconical face corresponding to, and cooperating with both the rear frustoconical face of the main sliding element and a bore opening onto the rear face of the corresponding slide, and which can be joined to devices for adjusting the position of the jaws of the machine-tool chuck; adapting jaws, that are capable of being removably attached to the jaw adjustment devices of the machine-tool chuck in place of said jaws and of penetrating inside the slide housings; and a resilient biasing element located between the frame and the main sliding element, having the effect of forcing the said main sliding element towards the rear face of the frame and which counters the pressing effect of the slide's frustoconical faces on the rear frustoconical face of the main sliding element.

Preferably, the following advantageous features are also implemented:

the collet includes an abutment element that is fixed to the front face of the frame at an adjustable position and provided with a transversal face for limiting the forward axial displacement of the main sliding element;

the collet per se includes an axial hollow portion for which a abutment ferrule for position adjustment of a workpiece is screwed to the frame and protrudes inside the said central hollow portion so as to provide a support for said workpiece when the latter is loaded on the collet;

the frustoconical face that is unitary with the main sliding element with which the frustoconical face of each stem of the collet per se cooperates is formed by the frustoconical-shaped nose of an inserted element that is affixed to the main sliding element by means of a tapping formed in the bore of said main sliding element cooperating with a thread adapted on said inserted element, the said frustoconical nose cooperating with the frustoconical face controlling the radial displacement of each stem of the collet per se;

the frustoconical face that is unitary with the main sliding element and with which the frustoconical face of each stem of the collet per se cooperates is formed by the front end of the main sliding element, which front end is frustoconical and has an axis aligned with the symmetry axis of the frame.

The present invention has many advantages including the following:

the possibility of inserting a collet that is specially adapted for a given task on an existing, unmodified chuck;

a high-precision positional clasping of the workpieces by virtue of the fact that the collet branches are only radially moveable;

easy mounting achieved by the abutment that is internal to one of the proposed types of collet;

protection of workpieces, especially when they are fragile, thanks to the tightening limitation of the proposed collet;

easy changing of collets, thanks to their specially-devised mounting device.

The invention will be better understood, and the secondary characteristics and their advantages will become apparent from the description given below by way of an example.

It is to be understood that the description and the drawings are only given as a non-limiting indication.

BRIEF DESCRIPTION OF THE DRAWINGS

Referece shall be made to the accompanying drawings, in which.

DESCRIPTION OF THE PREFERRED EMBODIMENTS

Figure 1:
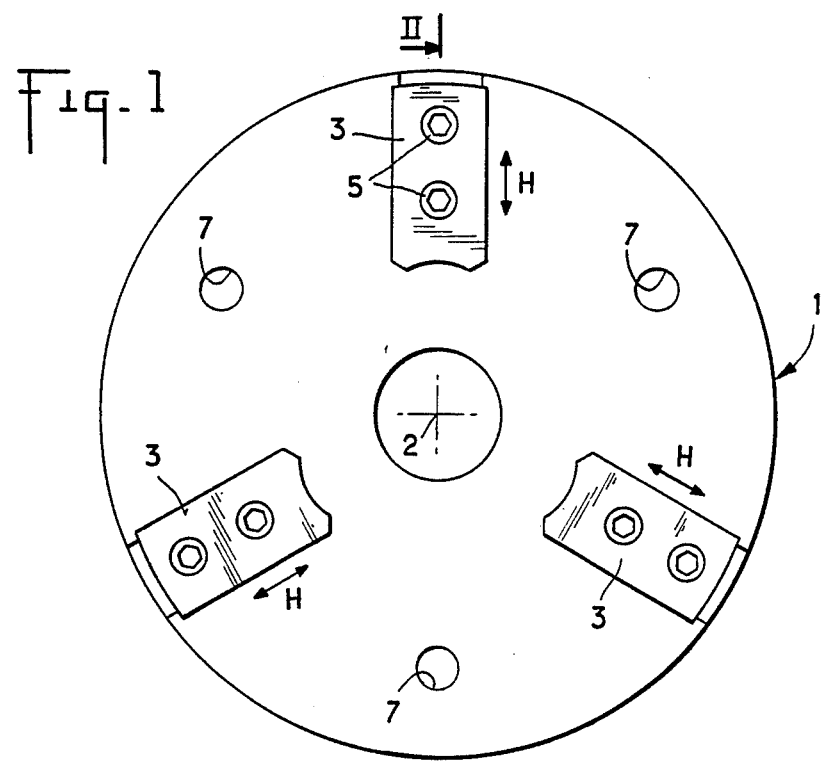
FIG. 1 is a front view of an exisiting jaw for a machine-tool, such as a lathe.
Figure 2:
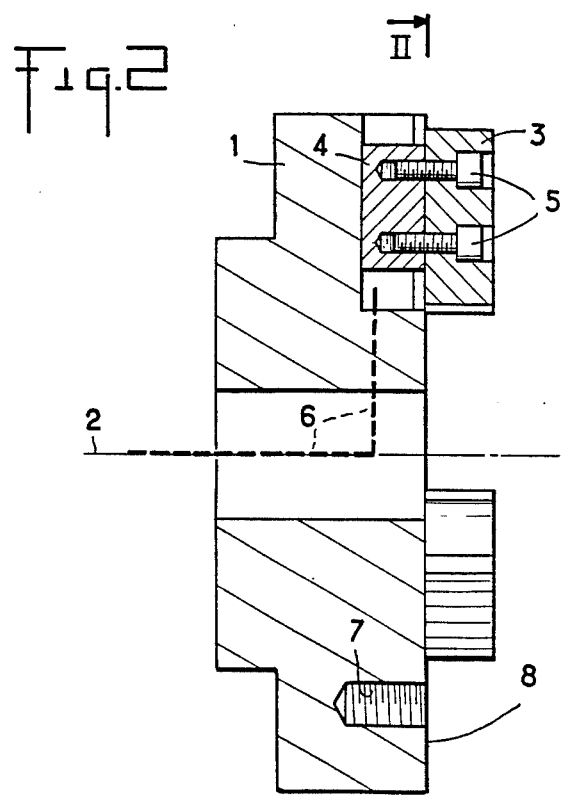
FIG. 2 is a simplified axial view of the jaw shown in FIG. 1 along the cross-section II—II of that last figure.

FIGS. 1 and 2 show an existing chuck for a machine tool, which in this case is a lathe. The above chuck 1 is mounted on the machine tool frame with rotation around a geometrical axis 2 so as to be driven into rotation by a machine-tool motor. The chuck 1 has three jaws 3 which are each fixed to a position-adjustment step 4, the latter steps 4 being displaceable along grooves in the chuck 1 extending radially (arrows H in FIG. 1). The jaws are fixed in a removable manner by screws 5, so that the said jaws 3 can be separated from the chuck 1. There is also provided a control device 6, shown schematically by a broken line, connected to the steps 4 to displace the latter. Finally, tapped bores 7 open onto the front face 8 of the chuck for enabling the mounting thereon of any complementary elements.

Figure 3:
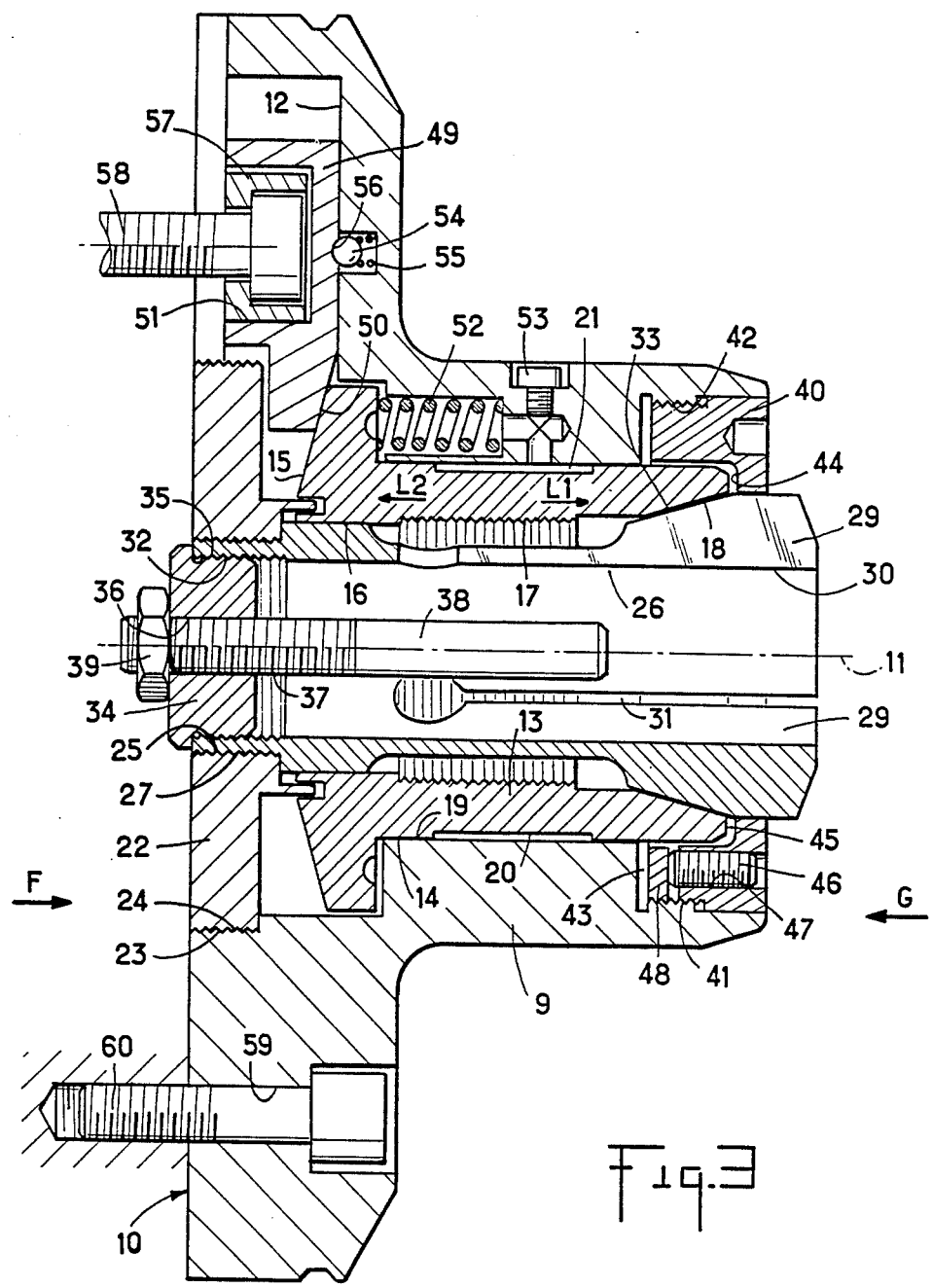
FIG. 3 is an axial cross-sectional view of a complete collet in accrdance with a first embodiment of the present invention.
Figure 4:
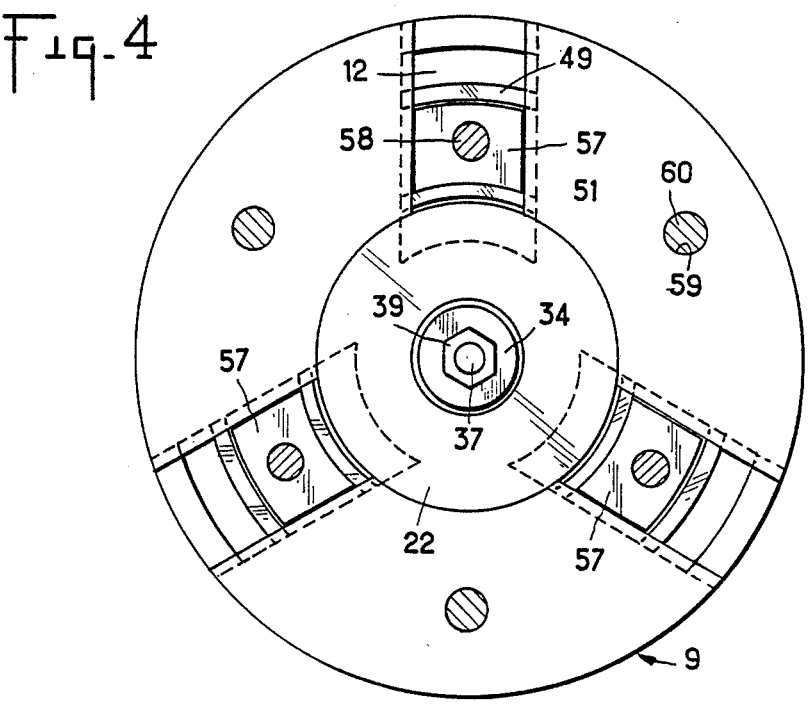
FIG. 4 is a view along arrow F of FIG. 3.
Figure 5:
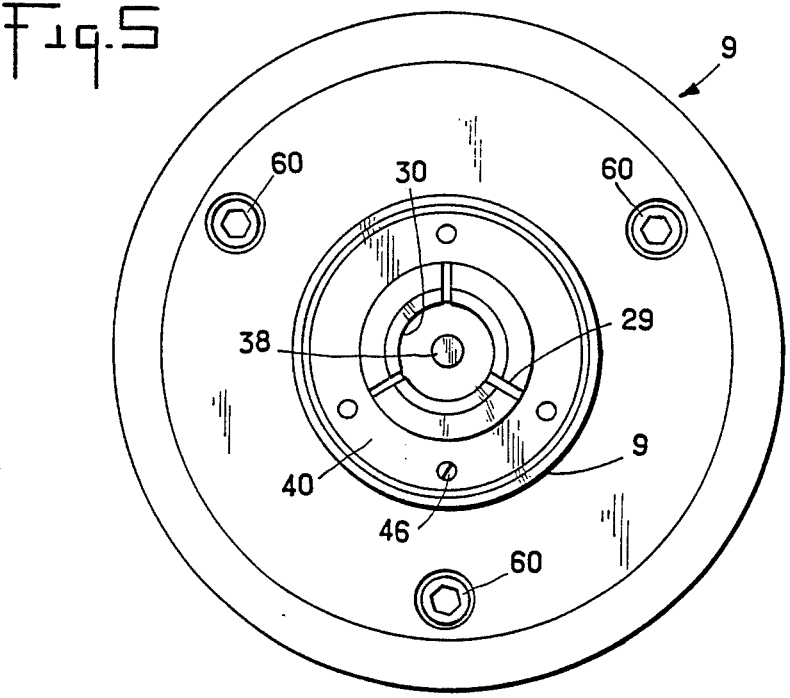
FIG. 5 is a view along arrow G of FIG. 3.

The complete collet, shown in FIGS. 3 to 5, comprises:

a frame 9 having a rear face 10 that can be applied against the front face 8 of the chuck 1, a bore 19, having a symmetry axis 11 and grooves 12 having a T-shaped transversal cross-section and which open onto the rear face 10;

a main sliding element 13 that includes an external cylindrical face 14 that is slidably mounted in the bore 19 of the frame 9, a frustoconical rear face 15 whose axis is aligned with the axis 11 of the frame's bore 19, a cylindrical bore 16, an internal tapping 17 in the extension of the bore 16, and an internal front face 18, which is also frustoconical and has an axis aligned with the axis of the frame's bore 19, a neck 20 being provided in the central portion of the external cylindrical face 14 in order to constitute a grease chamber 21 in cooperation with the bore 19;

a rear endpiece 22, which has an external thread 23 screwed into a bore 24 that is provided in the frame 9 and, which opens onto the rear face 10 of the said frame, the said rear endpiece having itself a tapped bore 25;

the collet per se 26, which includes a rear annular portion extending over approximately the rear third of the total length of the said collet and provided with a threaded external cylindrical portion 27, screwed into the tapped bore 25 of the rear endpiece 22, and three stems 29, joined to the said rear portion and mutually separated by spaces 31, and intended for securing a workpiece for machining, the said collet per se 26 having an axial hollow portion defined, near the front, by the internal cylindrical faces 30 of the stems 29, a rear tapping 32 and front frustoconical faces 33 of the stems 29, having an axis aligned with axis 11 and corresponding to the front frustoconical face (18) of the main sliding element 13;

a shield element 34 which has an external threading 35 for screw-mounting inside the tapping 32, as well as a tapped central orifice 36 to allow fixing of the external threaded portion 37 of an abutment ferrule 38 that extends inside the axial hollow portion of the collet per se 26, a nut 39 cooperating with the threaded portion 37 to ensure the blocking of the abutment ferrule 38 with respect to the shield element 34;

an abutment element 40, which includes a threaded external portion 41 that is screwed into a tapped bore 42 of a hollow 43 in the front portion of the frame 9, and a shoulder 44 for limiting the sliding displacement of the front transversal face 45 of the main sliding element 13, a screw 46 contained in a tapping 47 of the said abutment element 40 and capable of coming to bear on the bottom 48 of the tapping 47, whose periphery forms an element of the threaded portion 11, and thus of locking the abutment element 40 into position inside the hole 43;

three slides 49, each engaging into grooves 12, fitted with an inclined ramp 50 that corresponds to, and cooperates with, the rear frustoconical face 15 of the main sliding element 13 and each having a blind bore 51 opening onto the rear face 10 of the frame 9;

springs 52 placed between the frame 9 and the main sliding element 13 and serving to press the said main sliding element towards the rear (towards the rear face 10 of the frame);

a greaser 53 and its feed channels for grease supply of chamber 21 and of the chamber(s) that receive the springs 52;

ball bearings 54 biased by small springs 55 against indents 56 provided in the slides 49;

three adapting jaws 57 that can each be contained inside the bore 51 of a slide 49 and be fixed, by means of screws 58, on the chuck in place of the standard jaws 3, the said screws 58 each replacing a screw 5;

three shouldered through holes 59 provided in the frame 9, adapted to receive screws 60 (one of them is shown on FIG. 3) for fixing the frame 9 on the chuck 1, the standard jaws 3 having previously been removed and replaced by the adapting jaws 57.

Figure 6:
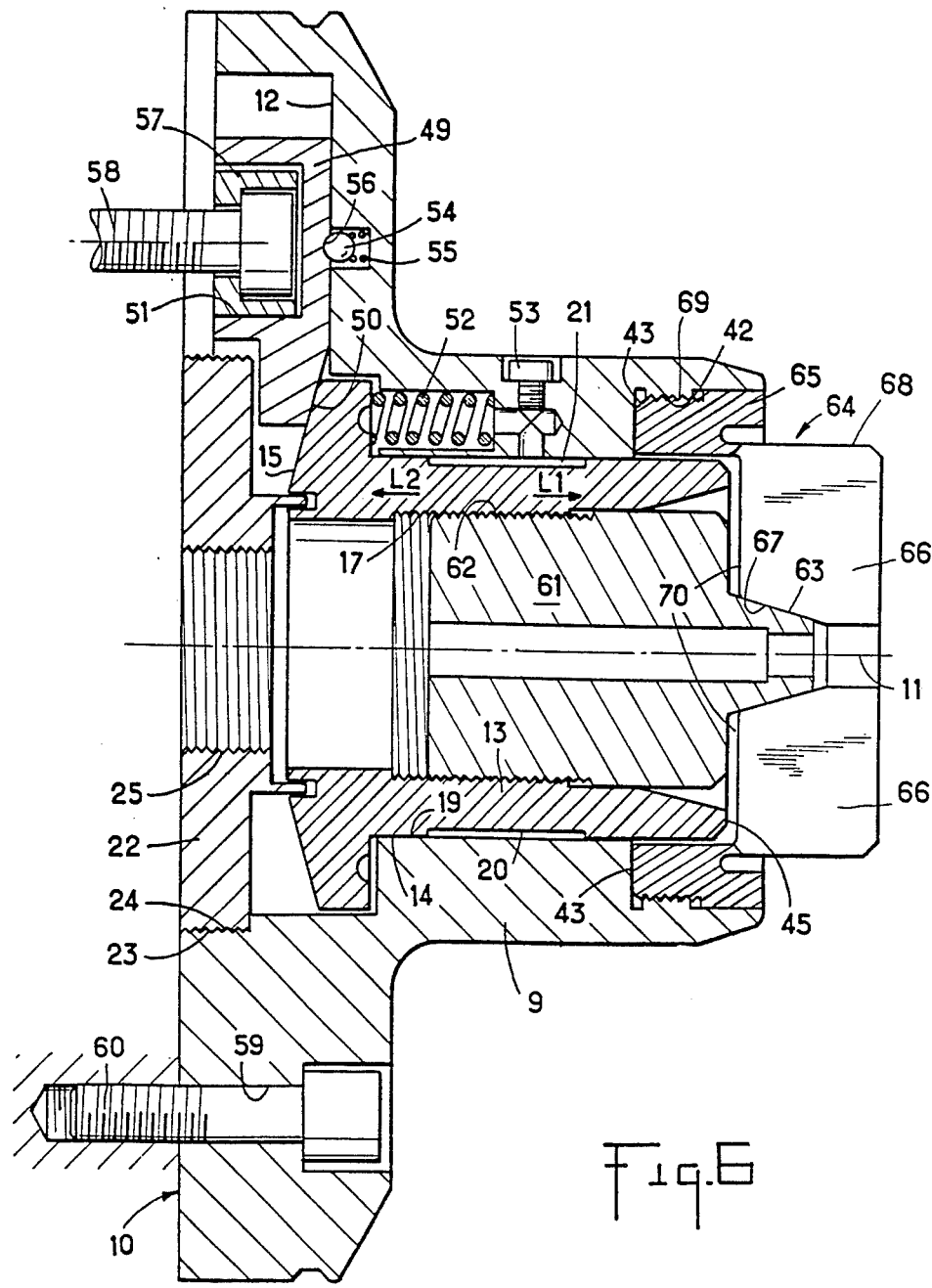
FIG. 6 is an axial cross-sectional view, similar to that of FIG. 3, of a complete collet according to a second embodiment of the present invention.

The embodiment of FIG. 6 shows all the constituent elements of the embodiment of FIG. 5 except for the collet per se 26, abutment element 40, the abutment ferrule 38 and its support 34. A cooperating abutment element 61 has a threaded external face 62 which is screw-mounted in the internal tapping 17 of the main sliding element 13, and a frustoconical front nose 63 whose axis coincides with the axis 11 of the frame 9. The collet per se 64 includes a rear body 65 fitted with a threaded external cylindrical face 69, which allows mounting inside the tapped bore 42 of the hollow 43, and four stems 66 which are separated from each other by spaces and have frustoconical face portions 67 which correspond to, and cooperate with, the frustoconical face of the nose 63 of the cooperating element 61. The external peripheral faces 68 of the ends of the stems 66 form the holding faces of the collet per se. Finally, the stems 66 of the collet per se are fitted with shoulders 70 near the rear, against which the front face 45 of the main sliding element can come into abutment.

When the collet of FIG. 3 is fitted to the chuck 1 by the screws 60, the adapting jaws 57 having been introduced by simple insertion into the bores 51 of the slides 49, the working is as follows: the slides 49 are radially displaced inside the grooves 12, e.g. towards axis 11 by means of the control device 6. The ramps 50 of the slides 49 exert a thrust on the frustoconical face 15 of the main sliding element 13, which has the effect of displacing the said element 13 towards the front, in the direction of the arrow L1. The collet per se 26 is axially immobilized with respect to the frame 9, being screwed (27-25) to the bottom 22, which is itself screwed (23-24) onto the frame 9. On the other hand, the thrust of the frustoconical face 18 of the main sliding element 13 on the frustoconical faces 33 of the stems 29 displaces the cylindrical holding faces 33 of the said stems in a radial direction, thereby causing the required clasping of the workpiece to be machined.

If the workpiece to be machined is fragile, and it is hence required to prevent the localized crushing thereof by the clasping faces 30, there is in this case just need to screw abutment element 40 into the hollow 43 of the frame to prevent any further displacement of the main sliding element 13 after its front transversal face 45 comes to bear on the shoulder 44 of element 40, thus limiting the radial displacement of the clasping faces 30 of the stems 29.

The displacement of the slides 49 away from axis 11 enables the springs 52 to press, in the direction of arrow L2, the main sliding element 13 and also enables the stems 29 to spread from axis 11 by their own elasticity, thus causing the holding of the workpiece to be machined. The axial immobilization of the collet per se also makes it possible to obtain a high degree of precision in the clasping of the workpiece to be machined.

The abutment ferrule 38 makes it very easy to install a workpiece for machining. Note also:

the very simple installation—by means of three screws 60—of the special collet for each type of workpiece to be machined;

the easy adaption of the collet to each type of workpiece to be machined by modification of the shape of the collet per se 26, or by the replacement of the abutment element by another abutment element adapted to the new workpiece to be machined;

that no intervention is required on the main chuck 1, of which only the standard jaws 3 are removed simply by unscrewing brackets 5 and are replaced by the adapting jaws 57. Finally, it is possible to machine workpieces that need to be clasped from inside a hollow, by using the collet of FIG. 6, whose stems 66 can spread out (move away from) and come into contact with the said hollow of the workpieces to be machined by their external faces 68.

There again, the front transversal face 45 of the sliding element pressing against the shoulders 70 enables the spreading of the stems to be limited, thereby allowing fragile workpieces to be clasped without spoiling them.

The invention is not limited to the embodiments shown, but covers all the embodiments that could be attributed thereto without departing from their scope or concept.

What is claimed is:

1. A chuck adapter for clasping a workpiece to be machined on a machine tool having a chuck which includes a front face, at least two clasping jaws movably affixed to jaw position adjustment means and a control device for the position adjustment means, comprising:
    a frame having front and rear faces, said rear face having a plurality of radial grooves formed therein and further including means for attachment to the chuck front face, said frame having a central bore opening on said frame front face, said central bore having an axis of symmetry;
    a main sliding element slidably carried within said central bore, having a frustoconical rear face disposed toward said frame rear face and a partially cylindrical, partially frustoconical bore opening toward said frame front face, said frustoconical bore portion lying at the extremity of said sliding element bore;
    a collet having a rear portion fixed to said frame rear face, and a front portion projecting toward said frame front face, said collet front portion including a plurality of stems uniformly distributed around the circumference thereof, each said stem having an interior face for clasping the workpiece and exterior frustoconical face, said exterior frustoconical face complementary to and bearing against said sliding element frusotoconical bore portion such that axial movement of said sliding element within said frame central bore results in radial movement of each said collet stem;
    a plurality of slides, slidably carried in said frame rear face grooves, each said slide having a frustoconical face complementary to and bearing against said sliding element frustoconical rear face such that movement of said slides within said grooves results in axial movement of said sliding element within said frame central bore;
    a plurality of adapting jaws, removably mounted on the chuck jaw position adjustment device and removably attached to said slides; and
    a resilient biasing member, located between said frame and said main sliding element, for urging said sliding element toward said frame rear face.

2. The chuck adapter of claim 1, further comprising an abutment element, adjustably carried on said frame front face, including a transverse shoulder positioned to limit the axial movement of said main sliding member toward said frame front face.

3. The chuck adapter of claim 1, wherein said collet further includes a central bore defined by said stems, said chuck adapter further comprising an abutment ferrule, fixed to said frame rear face and extending into said collet central bore, for limiting the penetration of said collet central bore by the workpiece.

4. The chuck adapter of claim 2, wherein said collet further includes a central bore defined by said stems, said chuck adapter further comprising an abutment ferrule, fixed to said frame rear face and extending into said collet central bore, for limiting the penetration of said collet central bore by the workpiece.

5. A chuck adapter for clasping a workpiece to be machined on a machine tool having a chuck which includes a front face, at least two clasping jaws movably affixed to jaw position adjustment means and a control device for the position adjustment means, comprising:
    a frame having front and rear faces, said rear face having a plurality of radial grooves formed therein and further including means for attachment to the chuck front face, said frame having a central bore opening on said frame front face, said central bore having an axis of symmetry;
    a main sliding element slidably carried within said central bore, having a frustoconical rear face disposed toward said frame rear face and a partially cylindrical, partially frustoconical bore opening toward said frame front face, said frustoconical bore portion lying at the extremity of said sliding element bore;
    a nose assembly, threadably attached to said main sliding element at said cylindrical bore, extending beyond said main sliding element toward said frame front face and terminating in a frustoconical nose;
    a collet having a rear portion fixed to said frame front face, and a front portion projecting beyond said frame front face, said collet front portion including a plurality of stems uniformly distributed around the circumference thereof, each said stem having an exterior face for clasping the workpiece and interior frustoconical face, said interior frustoconical face complementary to and bearing against said sliding element frustoconical nose such that axial movement of said nose within said frame central bore results in radial movement of each said collet stem;

a plurality of slides, slidably carried in said frame rear face grooves, each said slide having a frustoconical face complementary to and bearing against said sliding element frustoconical rear face such that movement of said slides within said grooves results in axial movement of said sliding element within said frame central bore;

a plurality of adapting jaws, removably mounted on the chuck jaw position adjustment device and removably attached to said slides; and a resilient biasing member, located between said frame and said main sliding element, for urging said sliding element toward said frame rear face.

* * * * *